UNITED STATES PATENT OFFICE.

CHARLES B. JACOBS, OF AMPERE, NEW JERSEY, ASSIGNOR TO THE AMPERE ELECTRO-CHEMICAL COMPANY, OF SAME PLACE.

ALKALINE-EARTH SILICID.

SPECIFICATION forming part of Letters Patent No. 656,353, dated August 21, 1900.

Application filed October 31, 1899. Serial No. 735,422. (No specimens.)

*To all whom it may concern:*

Be it known that I, CHARLES B. JACOBS, a citizen of the United States, residing at Ampere, in the county of Essex, in the State of New Jersey, have discovered certain new and useful Alkaline-Earth Silicids, of which the following is a specification.

This invention relates to a new and useful chemical compound consisting of the silicid of an alkaline-earth metal—namely, calcium barium or strontium silicid.

These compounds, which have the formula $CaSi_2$, $BaSi_2$, and $SrSi_2$, respectively, or generally the formula $RSi_2$, wherein R indicates any alkaline-earth metal, are the silicon analogous of the alkaline-earth carbids. I have discovered that when the carbonates, oxids, sulfates, or phosphates of the alkaline earths are mixed with silica in the form of ground quartz or sand in which the relative proportions of the alkaline-earth metal to the silicon in the mixture is as one is to two, and sufficient carbon to effect the reduction is added, or when silicates of the alkaline-earth metals in which the relation of the alkaline-earth metal to the silicon is as one is to two are mixed with sufficient carbon to take up the oxygen of the compounds present and heated in the electric furnace under conditions substantially like those maintained in the manufacture of alkaline-earth carbids, silicids of the alkaline-earth metals result.

As an example of the process, the following reactions for the formation of calcium silicid from the various calcium compounds are given:

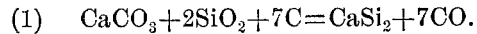
(1)   $CaCO_3 + 2SiO_2 + 7C = CaSi_2 + 7CO$.

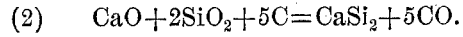
(2)   $CaO + 2SiO_2 + 5C = CaSi_2 + 5CO$.

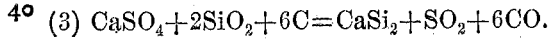
(3)   $CaSO_4 + 2SiO_2 + 6C = CaSi_2 + SO_2 + 6CO$.

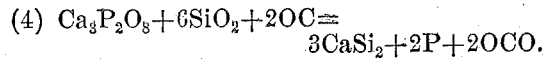
(4)   $Ca_3P_2O_8 + 6SiO_2 + 20C = 3CaSi_2 + 2P + 20CO$.

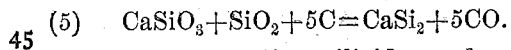
(5)   $CaSiO_3 + SiO_2 + 5C = CaSi_2 + 5CO$.

Barium and strontium silicids are formed by exactly similar reaction from similar compounds.

The following description of the formation of calcium silicid from lime and sand is given as an example of the manner in which the manufacture of any of the alkaline-earth silicids may be carried out. A difference in the relative weight of the mixtures will be necessary for oxids, carbonates, sulfates, phosphates, or silicates.

The type of electric furnace used may be any of those suitable for the manufacture of calcium carbid; but it is preferred to use the continuous rotary furnace described in United States Letters Patent No. 597,945 to Bradley, January 25, 1898.

The charge consists of lime, fifty-six to sixty parts, by weight, depending on purity; ground quartz or white sand, one hundred and twenty to one hundred and thirty parts, by weight, depending on purity, and ground coke or small anthracite, sixty to seventy parts, by weight, depending on purity. These are ground fine and thoroughly mixed and fed into the furnace through which the current is passing by the ordinary feed device. The carbon acts on the oxygen of the charge, forming carbon monoxid, and the calcium and silicon combine to form calcium silicid, which flows down or accumulates in the hearth of the furnace, when it solidifies on cooling and is removed in the usual manner. In reference to the products of this reaction—namely, the silicids of calcium, barium, and strontium, ($CaSi_2$, $BaSi_2$, $SrSi_2$)—these compounds, which are the silicon analogues of the alkaline-earth carbids, are formed at the temperature of the electric furnace when alkaline-earth compound and silica are reduced with carbon. They are white or bluish-white substances of metallic appearance and also resembling aluminium silicid and silicon somewhat in appearance. They possess a distinctly-crystalline fracture, showing plate-like crystals very similar to those seen in the fracture of cast-zinc, the crystals being, however, somewhat smaller in size. They oxidize slowly in the air and more rapidly under the influence of heat, yielding silicon dioxid and the oxid of the alkaline-earth metals present. Like the carbids, they decompose with water, but yield instead of acetylene hydrogen in a pure state, which is evolved without explosion, the following being the reaction:

(1) $CaSi_2 + 6H2O = Ca(OH)_2 + SiO_2 + 10H.$ (2) $BaSi_2 + 6H2O = Ba(OH)_2 + 2SiO_2 + 10H.$ (3) $SrSi_2 + 6H2O = Sr(OH)_2 + 2SiO_2 + 10H.$

The calcium compound decomposes slowly in cold water, but more rapidly in hot water. The barium compound decomposes rapidly in both cold and hot water. The strontium compound decomposes more rapidly in water than the calcium, but not so rapidly as the barium, compound. It will be noticed by considering the equations 1, 2, and 3 that all of these compounds evolve large volumes of hydrogen, one pound of $CaSi_2$ producing .104 pounds, or 18.73 cubic feet hydrogen, one pound of $BaSi_2$ producing .051 pounds, or 9.15 cubic feet, and one pound of $SrSi_2$ producing .069 pounds, or 12.36 cubic feet at 0° centigrade and seven hundred and sixty millimeters. As hydrogen producers they offer a means of making hydrogen from water for use in gas-engines, and particularly for use in gas-engines on automobile vehicles, since the hydrogen is practically pure, and all disagreeable odor and fume now so objectionable in gas-engines may be avoided.

The silicids decompose rapidly in dilute acids, the barium compound giving silica methane or silicon hydrid ($SiH_4$) mixed with more or less free hydrogen, the reaction being similar to that which takes place when magnesium silicid is treated with dilute hydrochloric acid. Calcium silicid, however, reacts in an entirely different manner when treated with dilute acids, either the oxy-acids or the hydrogen acids, and gives rise to the formation of a new compound, which has the formula $Si_2H_2$ and is therefore the silicon analogue of acetylene ($C_2H_2$) and must be called "silico-acetylene," since it bears the same relation to silico-methane (silicon hydrid $SiH_4$) as acetylene bears to methane ($CH_4$.) It is a bright-yellow crystalline powder. The reaction which produces it is as follows:

$$CASi_2 + 2HCl = CaCl_2 + Si_2H_2.$$

This product $Si_2H_2$ is more fully described and claimed in an application filed January 12, 1899, Serial No. 1,180.

Strontium silicid when treated with dilute acids acts in a manner intermediate between the action of the barium compound and the calcium compound, forming silicon hydrid, free hydrogen, and silico-acetylene.

Having thus described my invention, what I claim as new, and desire to secure by Letters Patent, is—

1. The chemical compound consisting of silicon combined with an alkaline-earth metal, in the proportion represented by the formula $RSi_2$, R representing the alkaline-earth metal, the same being white or bluish-white substances of metallic appearance, having a crystalline fracture, oxidizing slowly in the air to silicon dioxid and an alkaline-earth-metal oxid, and decomposed by pure water with the formation of the alkaline-earth-metal hydrate, silica and free hydrogen.

2. The chemical compound consisting of silicon combined with barium, in the proportion represented by the formula $BaSi_2$, the same being a white or bluish-white substance of metallic appearance, having a crystalline fracture, oxidizing slowly in the air to silicon dioxid and barium oxid, and decomposed by pure water with the formation of barium silicid, silica and free hydrogen.

CHARLES B. JACOBS.

Witnesses:
A. P. KNIGHT,
H. E. KNIGHT.